US010241760B2

(12) United States Patent
Rodrigues De Araujo et al.

(10) Patent No.: US 10,241,760 B2
(45) Date of Patent: Mar. 26, 2019

(54) SYSTEM AND METHOD FOR PERFORMING HIT TESTING IN A GRAPHICAL USER INTERFACE

(71) Applicant: Tactual Labs Co., New York, NY (US)

(72) Inventors: Bruno Rodrigues De Araujo, Toronto (CA); Jonathan Deber, Toronto (CA); Clifton Forlines, Toronto (CA); Ricardo Jorge Jota Costa, Toronto (CA); Daniel Wigdor, Toronto (CA)

(73) Assignee: TACTUAL LABS CO., New York, NY (US)

( * ) Notice: Subject to any disclaimer, the term of this patent is extended or adjusted under 35 U.S.C. 154(b) by 492 days.

(21) Appl. No.: 14/945,051

(22) Filed: Nov. 18, 2015

(65) Prior Publication Data

US 2016/0188303 A1    Jun. 30, 2016

Related U.S. Application Data

(60) Provisional application No. 62/081,250, filed on Nov. 18, 2014.

(51) Int. Cl.
*G06F 3/01* (2006.01)
*G06F 8/38* (2018.01)
*G06F 3/0488* (2013.01)
*G06F 3/041* (2006.01)

(52) U.S. Cl.
CPC .............. *G06F 8/38* (2013.01); *G06F 3/0416* (2013.01); *G06F 3/0488* (2013.01)

(58) Field of Classification Search
CPC combination set(s) only.
See application file for complete search history.

(56) References Cited

U.S. PATENT DOCUMENTS

| | | | |
|---|---|---|---|
| 2012/0206377 | A1 | 8/2012 | Zhao et al. |
| 2012/0216134 | A1 | 8/2012 | Neubacher et al. |
| 2013/0182003 | A1 | 7/2013 | Zhao et al. |
| 2014/0053112 | A1 | 2/2014 | Yu |

(Continued)

*Primary Examiner* — Van N Chow
(74) *Attorney, Agent, or Firm* — Adam Landa

(57) ABSTRACT

Disclosed are touch sensitive devices and methods of responding to hits in touch sensitive devices that include a graphical user interface having interface elements, each associated with a program element. A hit test map updater is used to process graphical user interface information into a hit test map in connection with the rendering of the graphical user interface, such that the hit test map associates properties with interface elements appearing on the graphical user interface. An input processor is used to receive a location corresponding to an input in connection with an input event, search the hit test map in which values are associated with interface elements appearing in the graphical user interface, and identify a property of the interface element from the values. In an embodiment, the identified property is proved to a central processing system and a user interface event is generated. In an embodiment, the properties received from the hit test map updater and the input processor are used to determine a program element associated with the property, and the program element is signaled. In an embodiment, the identified property is processed to determine a change to the graphical user interface, and the change is displayed.

45 Claims, 2 Drawing Sheets

(56) References Cited

U.S. PATENT DOCUMENTS

| | | | | |
|---|---|---|---|---|
| 2014/0143692 A1* | 5/2014 | Wigdor | ................ | G06F 3/0488 715/764 |
| 2015/0077355 A1* | 3/2015 | McCanny | ............ | G06F 3/0416 345/173 |
| 2015/0220216 A1* | 8/2015 | Wigdor | ................ | G06F 3/0482 715/765 |

\* cited by examiner

SYSTEM AND METHOD FOR PERFORMING HIT TESTING IN A GRAPHICAL USER INTERFACE

This application is a non-provisional of and claims priority to U.S. Patent Application No. 62/081,250 filed Nov. 18, 2014, the entire disclosure of which is incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BRIEF DESCRIPTION OF THE DRAWINGS

Objects, features, and advantages of the invention will be apparent from the following description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
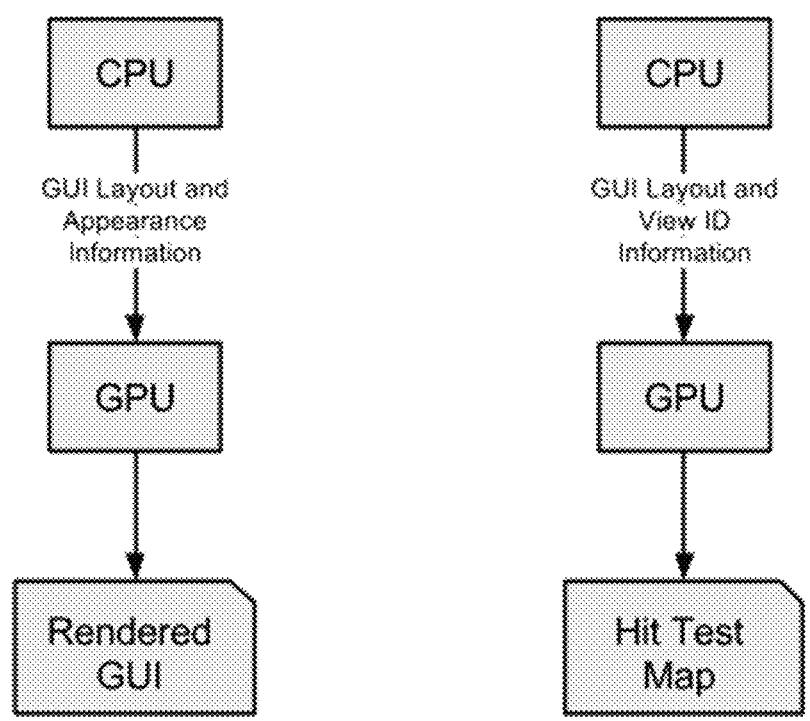
FIG. 1 shows a block diagram illustrating a first embodiment, variation A.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices to hit testing in a graphical user interface. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The present disclosure relates to processing of inputs from input sources such as touch sensitive devices, including those described in U.S. patent application Ser. No. 14/046,819 filed Oct. 4, 2013 entitled "Hybrid Systems And Methods For Low-Latency User Input Processing And Feedback," U.S. patent application Ser. No. 13/841,436 filed Mar. 15, 2013 entitled "Low-Latency Touch Sensitive Device," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," U.S. Patent Application No. 61/879,245 filed Sep. 18, 2013 entitled "Systems And Methods For Providing Response To User Input Using Information About State Changes And Predicting Future User Input," U.S. Patent Application No. 61/880,887 filed Sep. 21, 2013 entitled "Systems And Methods For Providing Response To User Input Using Information About State Changes And Predicting Future User Input," U.S. patent application Ser. No. 14/046,823 filed Oct. 4, 2013 entitled "Hybrid Systems And Methods For Low-Latency User Input Processing And Feedback," U.S. patent application Ser. No. 14/069,609 filed Nov. 1, 2013 entitled "Fast Multi-Touch Post Processing," and U.S. Patent Application No. 61/887,615 filed Oct. 7, 2013 entitled "Touch And Stylus Latency Testing Apparatus." The entire disclosures of those applications are incorporated herein by reference.

Hit testing is the process of examining an input to determine its target. In a graphical user interface, hit testing is typically carried out by examining the location of a user input, reported, for example, by the device driver of a pointing device such as a mouse, touch controller, pen tablet, etc., and comparing it to the position (often simplified to a bounding polygon) of the various graphical elements in the screen. As an example, if the user wishes to select the "ok" button in a GUI, the user touches his finger to it. The location of the finger touch is reported to the operating system, which may in turn report it to the software associated with the window manager, which may report it to a UI toolkit, which may report it to the software associated with the user interface element. Each of these steps typically requires 'hit testing'—the determination of which of the windows/UI elements/views is being targeted.

User interface testing can be computationally expensive. In many operating systems/UI toolkits, it requires the traversal of a data structure of elements to determine which object is being targeted. As the number of on-screen elements increases, the time required to traverse this data structure also increases. Since user interface elements may overlap (e.g., a pulldown menu containing device configuration settings can be opened on top of the interface of the active application), the OS must ensure that events are routed to the object that the user intends to target.

It is an object of the present invention to reduce the time required to perform hit testing. In so doing, the latency (that is, the time between the user's input to the system and the system's response to that input) may be reduced. It is an object of the present invention to perform hit testing on a system component that can quickly make use of the results. This process may be completed in a processor external to (or simply different from) a traditional general-purpose processor. One such method is to frame the approach in the form of operations that are used to process computer graphics, so that a graphics processing unit (GPU) may be employed. GPU-based implementations are advantageous because, in systems where processing subsequent to the input is also conducted on the GPU, no memory copy or other expensive operation is required to transfer the results of the hit test to the GPU.

One solution is to pre-generate a data structure in which values are associated with user interface elements. One such data structure is a 2D array, specifically a 2D array in which the values can be interpreted as pixels. In this case, hit testing becomes a simple 2-dimensional value lookup that utilizes pixel values (e.g., as part of a 2D GPU texture) as an indication of what user interface element is being "hit" by the probe (e.g., user's finger, stylus, etc.). This abstraction can be seen as a geometry shader or as an octa-tree data structure, amongst other possible implementations that provide fast response for each probe position. In this instantiation, this 2D texture may be generated at the initialization of the application and may be updated each time that a user interface element becomes visible, changes state, or is removed from the display. State changes related to position, size, z-ordering, and visibility can be recorded. In other instantiations, the texture is computed based on the already existent user interface elements, making its generation transparent to the developers. The hit test computation is independent of the appearance attributes of a given user interface view element (e.g., color and texture attributes), and relies on attributes such as bounds, visibility, and layout.

The various elements that make-up a user interface in a GUI are often arranged hierarchically. For example, a button may be contained inside a container, which in turn may be contained inside an application view. In this example, when the user provides input to the button (e.g., taps on it), a hit test could potentially yield the button in addition to all of its parent elements, since all of them are, by definition, physically overlapped in the user interface. Different systems handle this situation in different ways. In some systems, more than one element would be notified of (and perhaps respond to) the input. In some systems, all are notified. In others, bubble-up may be employed, where the smallest element is notified first, then the next-smallest, etc. In others, drill-down methods may be employed, where the largest container is notified first, followed by sequentially smaller elements. No matter the scheme, there is typically a desire for a hit test to subsequently result in a notification of more than one piece of software. In some embodiments of the present invention, the hit test may resolve to only a single element, which is associated with the others in another data structure external to the invention. In other embodiments, the data structure produced by the process may include information reflecting this hierarchy. One example of such an association is one encoded in the pixel values assigned to each pixel in an element. The elements in a hierarchy might contain some common aspect to their pixel values (e.g., their value might be indicative of a shade of red), and the values might be arranged to reflect this hierarchy (e.g., one element is higher in the hierarchy because it is a more intense red). The reader should, of course, understand that the data structure described in such an embodiment does not physically contain colors, but rather digital values which may be interpreted as colors, other interpretations are possible. Existing interpretations could be applied (such as the one described above for colors), or could themselves reflect a data structure, such as encoding the hierarchy itself in the values of the pixels, using methods known to the person of ordinary skill, such as encoding a tree in a 1-dimensional array.

Similarly, the pixel value (or parts of the pixel value, in binary or other form on information representation) might be associated to functionality rather than to hierarchy. For example, elements which may respond to a 'tap' might be encoded with a similar value, while those which will respond to a sliding gesture might have different set of similar values.

In an embodiment, the pixel can contain multiple elements of information, encoded into each bit of the pixel value, a person of ordinary skill can decode each information using known methods of filtering the value in binary or other base. In this example, a single bit of information might encode clickable status, scrollable status, etc. Multiple bits of information can encode element ID, hierarchy, etc.

In an embodiment, the system contains a number of pixel sets, each of which encode one or more elements of information in their values.

Optionally, similar views might be encoded for the likelihood/probability of having been targeted by the user. For example, the center of an element might be more likely than the outskirts of an element, and the hit test map might offer some error correction based on how likely is that element to be hit, or what is the closest hittable element.

In some embodiments, the hit test computation is a fast process which is performed at each input touch event update extending the touch information with logical application dependent information. This information, corresponding to the user interface element identification, can be used for several purposes, such as updating the visual representation of an element, due to a hit for example, or to trigger application actions or commands. To provide a fast and efficient way to generate this information, a computation unit (GPU or otherwise) is used to perform lookups to the pre-generated texture in a parallel manner for each touch event. The touch event is uploaded to the computation unit, as fast as possible, using vertex buffer objects or other possible known methods. The hit test result is shared through memory download or directly shared to other rendering stages using internal computation unit referenced memory. This process can be implemented using geometry shader or any equivalent compute shader technology. The result is stored directly on the memory using bidirectional functionalities such as transform feedback vertex data. The touch information stored in this vertex buffer may include all the data gathered from the input device complemented with the logical ID resulting of the hit test computation for each touch items. A special ID can be used to represent a "no hit" result, for example if the probe hits a pixel corresponding to the application background. The updated data can be then read back to the processing unit, to notify the application or user interface elements. Alternatively this updated data can be reused directly by the computational unit, for example to complement the rendering of a given view or UI element. This path is faster and takes directly advantage of the computational unit, in an embodiment by using only its dedicated internal memory for any task executable by the computational unit, i.e. not limited to rendering or any update of the user interface element appearance. For example any logical processing from the application delegated to the computational unit can be triggered internally without any cross-talking from multiple computation units. While the most common usage could be visual updates resulting from user clicking actions, for example on buttons, it can also automatically trigger scrolling or visibility change actions of a given user interface element.

The logical ID may represent additional attributes, examples of which include scalability, gesture availability, transparency, or multiple object ID per logical ID, representing the visual hierarchy. The conversion between the logical ID and the object that is responsible for the visual representation can be as simple as a table lookup, or as complex as a function that converts the ID into a pointer to a callback function. These lookup can be implemented in the computational unit or in an external process. Once the lookup is executed, the simplest way to resolve this action is to send the information back to the system and generate a user interface event—mimicking the current workflow of user interface hit test events. In another embodiment, the lookup information is converted into a pointer corresponding to the element and the element is directly called to action. In another embodiment, the pointer is directed at a shader or similar, and the appearance changes are dealt inside the computational unit, other events may be triggered in the system to account for non-visual responses.

With reference to FIG. 1, one variation (referred to herein as Variation A) is to render the hit test map in its own process at request. In this variation, the computational unit is tasked with rendering the GUI for display and with rendering the hit test map for hit testing separately. For rendering the GUI for display, the CPU/OS sends the appropriate drawing commands to the computational unit needed for rendering. Thus, as shown in FIG. 1, in Variation A the GPU is used to render views of the GUI and Hit Test Maps separately and calls to the GPU to create the hit test map are separate from calls to the GPU to create renderings of the GUI.

Figure 2:
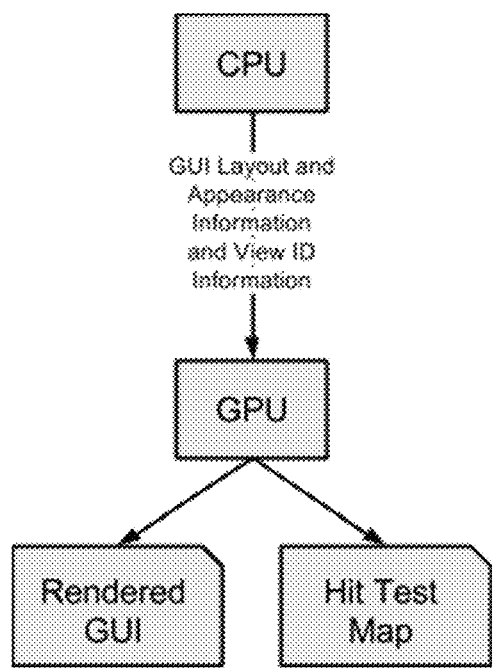
FIG. 2 shows a block diagram illustrating a second embodiment, variation B.

With reference to FIG. 2, another variation is to render hit test map in-line with the rendering of the user interface itself. The second variation (Variation B) would require the OS to send an ID associated with the view to the computational unit so that the computational unit could render the user interface and the hit test map at the same time. In this way, the hit test map would be available for any change in the visual appearance of the GUI. Thus, as shown in FIG. 2, in variation B the OS sends view ID information to the GPU so that it can generate not only the rendered GUI to display, but also the hit test map for hit testing.

Figure 3:
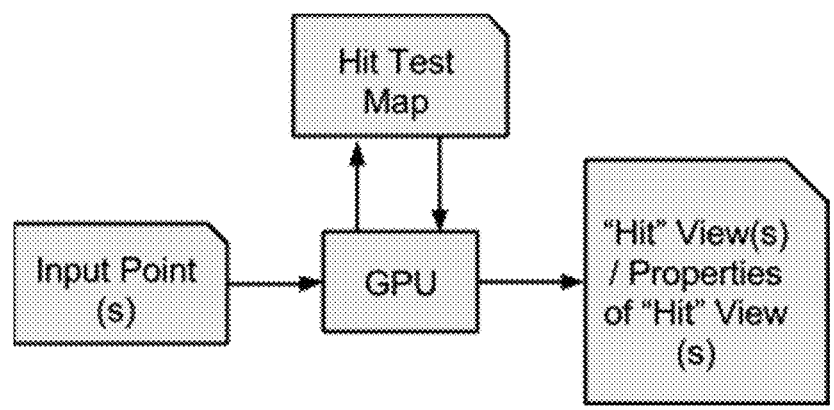
FIG. 3 shows a block diagram illustrating use of a hit test map by a GPU.

With reference to FIG. 3, using the Hit Test Map, the GPU is able to quickly take an input point or points and lookup which view or views in the GUI it/they are associated with.

Thus, disclosed are touch sensitive devices and methods of responding to hits in touch sensitive devices that include a graphical user interface having interface elements, each associated with a program element. A hit test map updater is used to process graphical user interface information into a hit test map in connection with the rendering of the graphical user interface, such that the hit test map associates properties with interface elements appearing on the graphical user interface. The hit test map updater can be any module or set of code running on a hardware processor of a computing device. An input processor is used to receive a location corresponding to an input in connection with an input event, search the hit test map in which values are associated with interface elements appearing in the graphical user interface, and identify a property of the interface element from the values. The input processor can likewise be any module or set of code running on a hardware processor of a computing device. The term "input' as used herein includes any actual or anticipated input, including a gesture, hover, touch, contact, or the like. In an embodiment, the identified property is proved to a central processing system and a user interface event is generated. In an embodiment, the properties received from the hit test map updater and the input processor are used to determine a program element associated with the property, and the program element is signaled. In an embodiment, the identified property is processed to determine a change to the graphical user interface, and the change is displayed.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Throughout this disclosure, the terms "touch", "touches," "contact," "contacts" or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch" when used as a noun include a near touch and a near touch event, or any other gesture that can be identified using a sensor.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. A method of responding to hits in a touch sensitive device comprising a graphical user interface having a plurality of interface elements, each of the plurality of interface elements being associated with at least one program element, the method comprising the steps of:
using a hit test map updater to process graphical user interface information into a hit test map in connection with the rendering of the graphical user interface, whereby the hit test map associates properties with interface elements appearing on the graphical user interface;
using an input processor to:
receive a location corresponding to an input in connection with an input event;
search the hit test map in which values are associated with interface elements appearing in the graphical user interface;
identify a property of the interface element from the values;
providing the identified property to a central processing system and generating a user interface event.

2. The method of claim 1, wherein the input comprises graphical user interface layout and appearance information.

3. The method of claim 1, wherein the input comprises graphical user interface layout and view ID information.

4. The method of claim 1, wherein the input comprises an input point.

5. The method of claim 4, wherein the input point is an actual location of an input.

6. The method of claim 4, wherein the input point is an anticipated location of input.

7. The method of claim 4, wherein the input point is a direct contact with the interface element.

8. The method of claim 4, wherein the input point is a gesture upon the interface element.

9. The method of claim 1, wherein the hit test map comprises a pre-generated data structure consisting of user interface elements.

10. The method of claim 9, wherein the pre-generated data structure is a 2D array.

11. The method of claim 10, wherein the 2D array contains values that represent pixels.

12. The method of claim 11, wherein the pixels contain multiple elements of information.

13. The method of claim 11, wherein the pixels are arranged into pixel sets that encode one or more elements of information that correspond to value.

14. The method of claim 1, further comprising searching a pre-generated data structure at each input event update.

15. The method of claim 14, wherein information is obtained from the searching of the pre-generated data structure and is uploaded into the graphics processing unit.

16. The method of claim 15, wherein the uploaded information and the result of the hit test are shared with the central processing system.

17. The method of claim 15, wherein the uploaded information is shared with one or more pieces of software.

18. The method of claim 1, wherein a computation unit is used to search the hit test map in parallel with the input event.

19. The method of claim 18, wherein the input event is uploaded to the computation unit.

20. The method of claim 18, wherein the computation unit is a graphics processing unit.

21. The method of claim 1, wherein a hit test result is shared through memory download.

22. The method of claim 1, wherein a hit test result is shared directly through referenced memory.

23. A method of responding to hits in a touch sensitive device comprising a graphical user interface having a plurality of interface elements, a graphics processing unit, and a central processing system, the method comprising the steps of:
receiving a location corresponding to an input;
searching a pre-generated hit test map in which values are associated with interface elements appearing in the graphical user interface and identifying a property of the interface element from the values; and
providing the property to the central processing system and generating a user interface event.

24. A touch sensitive device comprising:
a graphical user interface having a plurality of interface elements, each of the plurality of interface elements being associated with at least one program element;
a hit test map updater adapted to process graphical user interface information into a hit test map in connection with the rendering of the graphical user interface, whereby the hit test map associates properties with interface elements appearing on the graphical user interface;
an input processor adapted to;
    receive a location corresponding to an input in connection with an input event;
    search the hit test map in which values are associated with interface elements appearing in the graphical user interface;
    identify a property of the interface element from the values;
    provide the identified property to a central processing system; and
    generate a user interface event.

25. The touch sensitive device of claim 24, wherein the input comprises graphical user interface layout and appearance information.

26. The touch sensitive device of claim 24, wherein the input comprises graphical user interface layout and view ID information.

27. The touch sensitive device of claim 24, wherein the input comprises an input point.

28. The touch sensitive device of claim 27, wherein the input point is an actual location of an input.

29. The touch sensitive device of claim 27, wherein the input point is an anticipated location of input.

30. The touch sensitive device of claim 27, wherein the input point is a direct contact with the interface element.

31. The touch sensitive device of claim 27, wherein the input point is a gesture upon the interface element.

32. The touch sensitive device of claim 24, wherein the hit test map comprises a pre-generated data structure consisting of user interface elements.

33. The touch sensitive device of claim 32, wherein the pre-generated data structure is a 2D array.

34. The touch sensitive device of claim 33, wherein the 2D array contains values that represent pixels.

35. The touch sensitive device of claim 34, wherein the pixels contain multiple elements of information.

36. The touch sensitive device of claim 34, wherein the pixels are arranged into pixel sets that encode one or more elements of information that correspond to value.

37. The touch sensitive device of claim 24, wherein the input processor is adapted to search the pre-generated data structure at each input event update.

38. The touch sensitive device of claim 37, wherein information is obtained from the searching of the pre-generated data structure and is uploaded into the graphics processing unit.

39. The touch sensitive device of claim 38, wherein the input processor is adapted to share the uploaded information and the result of the hit test are with the central processing system.

40. The touch sensitive device of claim 38, wherein the uploaded information is shared with one or more pieces of software.

41. The touch sensitive device of claim 24, further comprising a computation unit adapted to search the hit test map in parallel with the input event.

42. The touch sensitive device of claim 41, wherein input processor is adapted to upload the input event to the computation unit.

43. The touch sensitive device of claim 41, wherein the computation unit is a graphics processing unit.

44. The touch sensitive device of claim 24, wherein the input processor is adapted to share a hit test result through memory download.

45. The touch sensitive device of claim 24, wherein the input processor is adapted to share a hit test result directly through referenced memory.

* * * * *